(12) United States Patent
Barnings et al.

(10) Patent No.: US 9,378,442 B2
(45) Date of Patent: *Jun. 28, 2016

(54) SYSTEM AND METHOD FOR PROTECTING A MACHINE READABLE CARD

(71) Applicants: Kristopher Barnings, Amarillo, TX (US); Walter Steelman, Amarillo, TX (US)

(72) Inventors: Kristopher Barnings, Amarillo, TX (US); Walter Steelman, Amarillo, TX (US)

(73) Assignee: CP Security, LLC, Amarillo, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/205,359

(22) Filed: Mar. 11, 2014

(65) Prior Publication Data

US 2014/0183265 A1 Jul. 3, 2014

Related U.S. Application Data

(63) Continuation-in-part of application No. 13/229,732, filed on Sep. 11, 2011, now abandoned, and a continuation-in-part of application No. PCT/US2012/000393, filed on Sep. 11, 2012.

(60) Provisional application No. 61/671,794, filed on Jul. 15, 2012.

(51) Int. Cl.
G06K 5/00 (2006.01)
G06K 19/00 (2006.01)
G06K 19/077 (2006.01)

(52) U.S. Cl.
CPC ........ *G06K 19/005* (2013.01); *G06K 19/07728* (2013.01); *Y10T 29/49826* (2015.01)

(58) Field of Classification Search
USPC .......................................... 235/488, 487, 492
See application file for complete search history.

(56) References Cited

U.S. PATENT DOCUMENTS

| | | | |
|---|---|---|---|
| 4,370,397 A | 1/1983 | Ceintrey et al. | |
| 4,711,347 A | 12/1987 | Drexler et al. | |
| 4,865,890 A | 9/1989 | Erlichman | |
| 5,345,070 A | 9/1994 | Hlavinka et al. | |
| 5,532,459 A | 7/1996 | Steinmetz et al. | |
| 5,941,375 A | 8/1999 | Kamens et al. | |
| 6,905,742 B2 | 6/2005 | Koneripalli et al. | |
| 6,913,188 B2 | 7/2005 | Wong et al. | |
| 7,028,893 B2 | 4/2006 | Goodman et al. | |
| 7,540,412 B2 * | 6/2009 | Webb et al. | ................... 235/380 |
| 7,748,608 B2 | 7/2010 | Tanner et al. | |

(Continued)

FOREIGN PATENT DOCUMENTS

WO WO94/29769 12/1994

*Primary Examiner* — Daniel St Cyr
(74) *Attorney, Agent, or Firm* — Law Office of Shannon Warren, PLLC

(57) ABSTRACT

A machine readable card protector is disclosed comprising: a sleeve having a first portion, a second portion, a width, a height, and a plurality of edges (having a first side edge, a second side edge, a top edge, and a bottom edge). Said sleeve having at least one open edge capable of receiving a portion of a machine readable card; and at least one of said plurality of edges are sealed between said first portion and said second portion. Said machine readable card having a first side and a second side. Said machine readable card having one or more machine readable components. Said sleeve is capable of protecting said one or more machine readable components. Said sleeve is made of a sleeve material, wherein said one or more machine readable components are readable through said sleeve.

21 Claims, 13 Drawing Sheets

(56) References Cited

U.S. PATENT DOCUMENTS

| | | | |
|---|---|---|---|
| 8,302,858 B2 * | 11/2012 | Eng | 235/380 |
| 2003/0127521 A1 * | 7/2003 | Tsai et al. | 235/486 |
| 2004/0148837 A1 | 8/2004 | Lewis | |
| 2011/0048594 A1 | 3/2011 | Arnone | |
| 2012/0000393 A1 | 1/2012 | Chow et al. | |

* cited by examiner

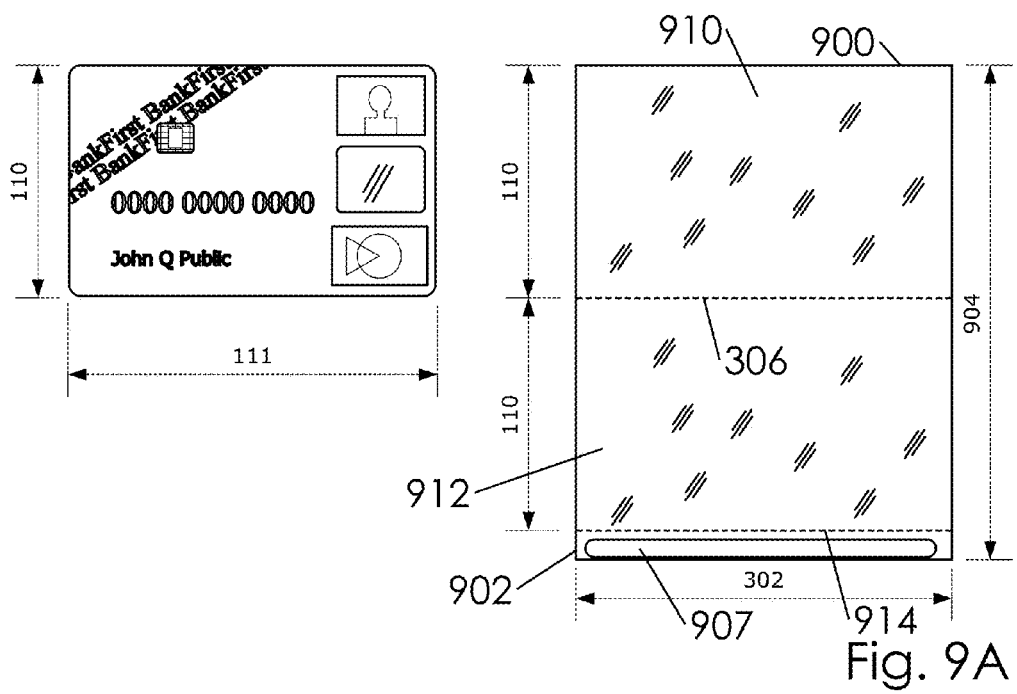
Fig. 9A
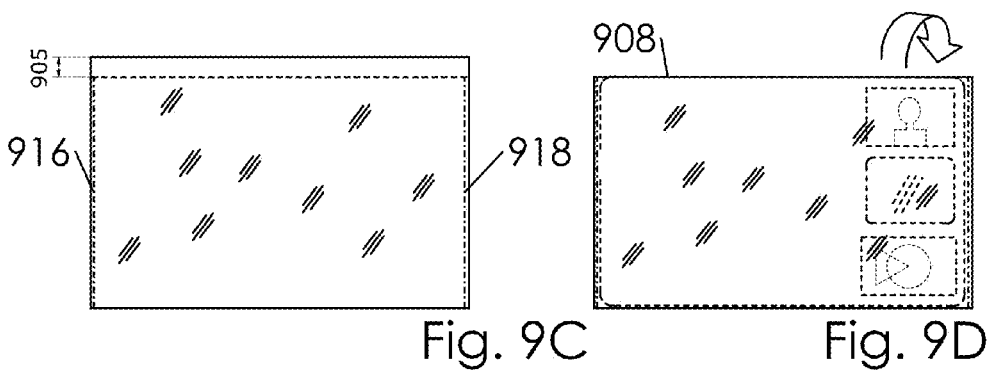
Fig. 9B
Fig. 9C    Fig. 9D

SYSTEM AND METHOD FOR PROTECTING A MACHINE READABLE CARD

This US patent application is a continuation in part of U.S. patent application Ser. No. 13/229,732 a nonprovisional application filed Sep. 11, 2011, of U.S. Patent Application No. 61/671,794 a provisional application filed Jul. 15, 2012, and PCT application PCT/US2012/000393 filed Sep. 11, 2012.

BACKGROUND

Machine readable cards (such as a credit card, a government identification card, a driver's license, a corporate identification card, a student identification card, or similar) are a well-known part of modern life. Many people are bound to carry around many of said machine readable cards for extended periods of every day. Their ubiquity has arisen on account of their convenience and many uses. Despite their usefulness, however, many components of said machine readable cards are fragile and prone to damage. For example, some cards comprise a magnetic strip. Magnetic strips are prone to damage due to repeated use due to friction wearing away critical portions of said magnetic strip. Likewise, holograms, electronic tags, thumbprints, and signatures are prone to harm due to repeated use and movement of said machine readable cards. Such use and movement can occur by the act of reading a magnetic strip with a card reader (sometimes called "swiping" a card). In another embodiment, merely carrying a card in one's pocket can cause a frequent rubbing of one card on another and thereby ruining a portion of said card. Likewise, carrying multiple cards in a stack in a pocket can cause several cards to be harmed due to said frequent rubbing.

Solutions for protecting said machine readable cards are well-known but, ultimately, ineffective. For example, in one embodiment, banks will ship new cards to users in a card sized envelope. Some such envelopes comprise protective materials for keeping their contents safe from friction and other harmful elements. This approach, however, only works where a user is willing to keep track of the bank issued envelope. This goal often proves to be unachievable due to mishandling and misplacing said envelope. Further, where said card is held in said envelope, the combination of the two is unlikely to fit in a standard credit card slot in an envelope. Consequently, many banks have ceased to issue cards in said envelopes altogether.

Another approach is to laminate said machine readable cards to ensure that portions of said cards are protected from harm. This approach fails, however, because lamination often makes cards unreadable by card readers. For example, in one embodiment, a laminated credit card will be too thick for a credit card reader. In another embodiment, a magnetic strip cannot be read through said lamination. Further, lamination is not removable and repositionable in cases where the machine readable card must be replaced or altered.

This disclosure relates generally to a system and method for protecting a machine readable card. In one embodiment, said machine readable card comprises a credit card, but use of a credit card is illustrative only and not limiting. Examples of card protectors can be found in US 2011/0048594 A1, US 2004/0148837, U.S. Pat. Nos. 4,370,397, 4,711,347, 4,865, 890, 5,345,070, 5,532,459, 5,941,375, 6,905,742 B2, 6,913, 188 B2, 7,028,893 B2, 7,748,608 B2, and WO 94/29769 A. However, one of the above inventions, taken either singularly or in combination, is seen to describe the instant disclosure as claimed. Accordingly, an improved system and method for protecting a machine readable card would be advantageous.

SUMMARY

A machine readable card protector is disclosed. Said machine readable card protector comprising: a sleeve having a first portion and a second portion; said sleeve having a width and a height; said sleeve having a plurality of edges having a first side edge, a second side edge, a top edge, and a bottom edge; said sleeve having at least one open edge capable of receiving a portion of a machine readable card. Said sleeve having at least one of said plurality of edges are sealed between said first portion and said second portion. Said machine readable card having a first side and a second side. Said sleeve is capable of holding said machine readable card between said first portion and said second portion. Said machine readable card having one or more machine readable components. Said sleeve is capable of protecting said one or more machine readable components. Said sleeve is made of a sleeve material, wherein said one or more machine readable components are readable through said sleeve.

BRIEF DESCRIPTION OF THE DRAWINGS

FIGS. 9A, 9B, 9C and 9D illustrate a plurality of views of a second construction method for said sleeve 200.

DETAILED DESCRIPTION

Described herein is an improved system and method for protecting a machine readable card. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
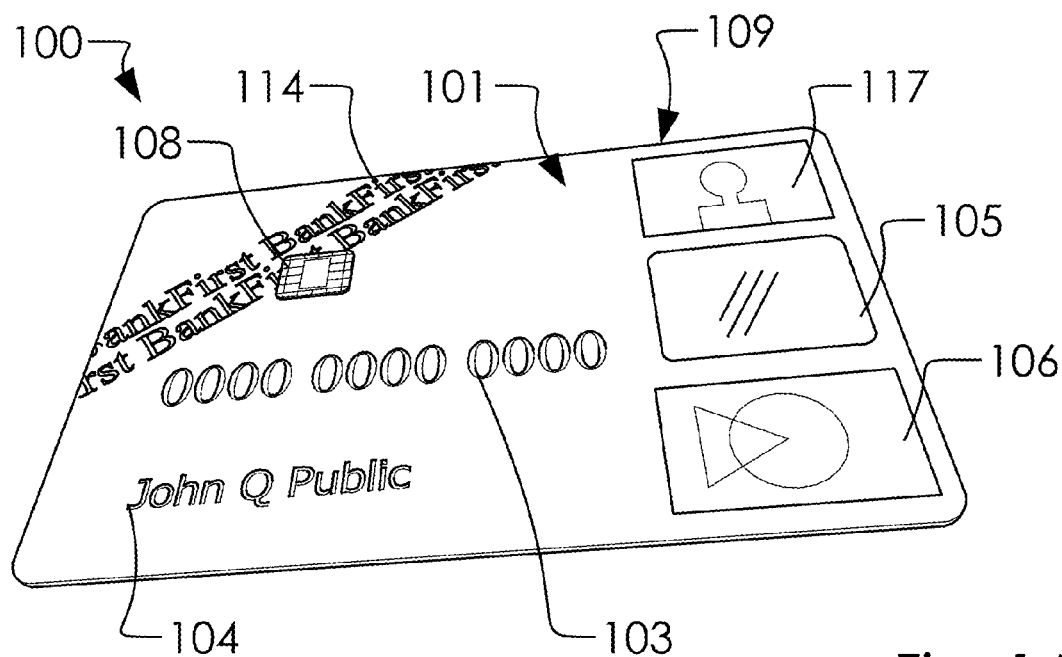
FIGS. 1A and 1B illustrate a front view and a back view of a card 100.
Figure 1B:
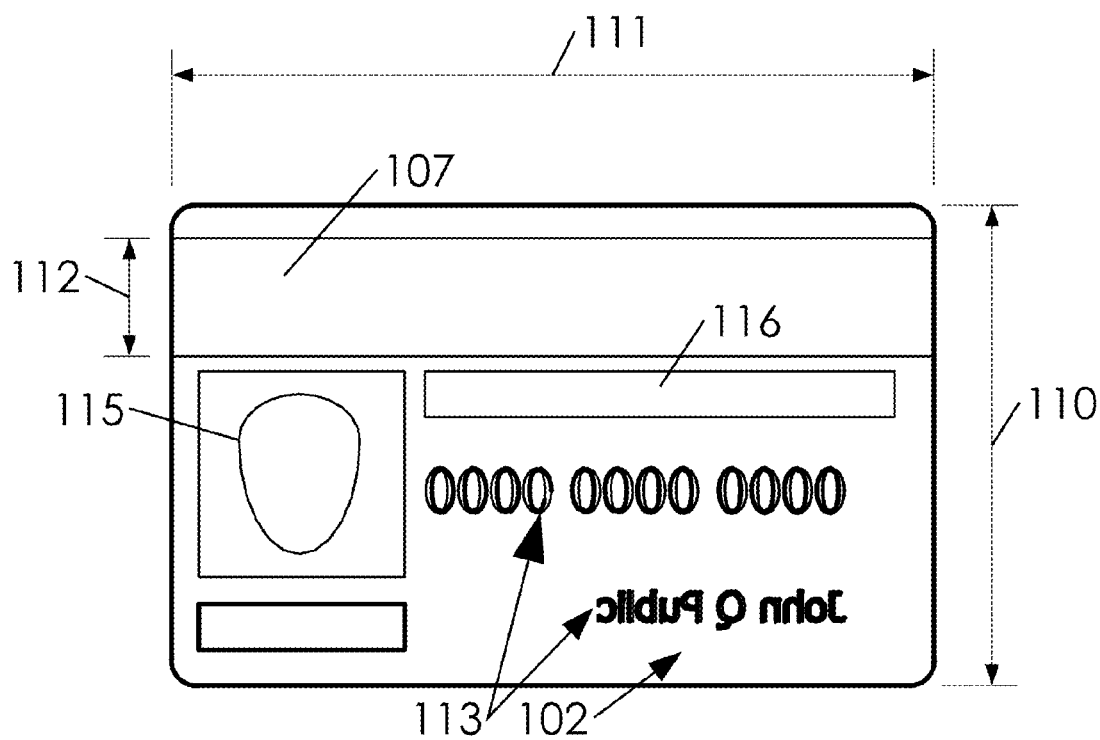

FIGS. 1A and 1B illustrate a front view and a back view of a card 100. Card 100 can comprise a first side 101, a second side 102, an identifier 103, a username 104, hologram 105, a bank logo 106, a magnetic strip 107, and an electronic tag 108. Further, card 100 can comprise a card height 110 and a card width 111. In one embodiment, magnetic strip 107 can comprise a magnetic strip height 112. In one embodiment, identifier 103 and username 104 can be stamped into card 100 thereby creating one or more indentions 113 in second side 102. Further, card 100 can comprise a watermark 114, a thumbprint 115 a signature block 116 and a user picture 117. In one embodiment, card 100 can comprise one or more machine readable components, such as identifier 103, username 104, magnetic strip 107, electronic tag 108, watermark 114, thumbprint 115 or signature block 116. In one embodiment, card 100 can comprise identifying components such as said identifier 103, said username 104, said hologram 105, said bank logo 106, said magnetic strip 107, said electronic tag 108, said watermark 114, said thumbprint 115, said signature block 116, and/or said user picture 117. Said card 100 can comprise identifying information, protected information, privileged information, or similar. In one embodiment, portions of card 100 can be capable of reflecting an otherwise hidden message when an irregular light is shown thereupon; for example, in one embodiment, hologram 105 or watermark 114 can comprise an image visible only when a black light is reflected off of it. In one embodiment, card 100 can comprise a credit card, a government identification card, a driver's license, a corporate identification card, a student identification card, or similar. In one embodiment, electronic tag can comprise an RFI strip, RFID tag, a short range wireless communications tag, a long range wireless communications tag, a wireless communications tag, and/or a "smart tag", as is known in the art.

Figure 2A:
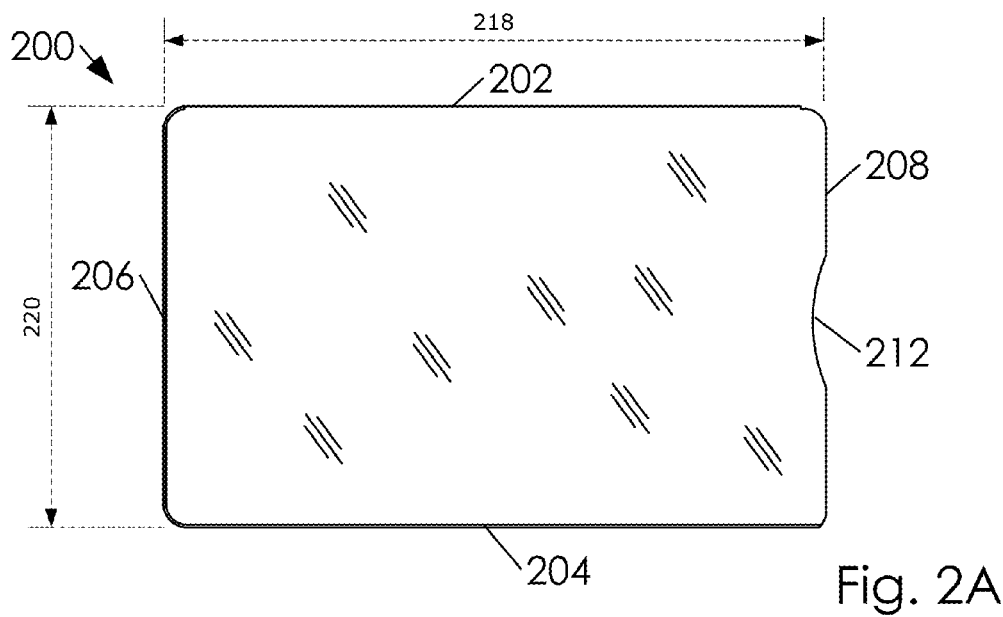
FIGS. 2A and 2B illustrate an elevated front view and a perspective overview of a sleeve 200.
Figure 2B:
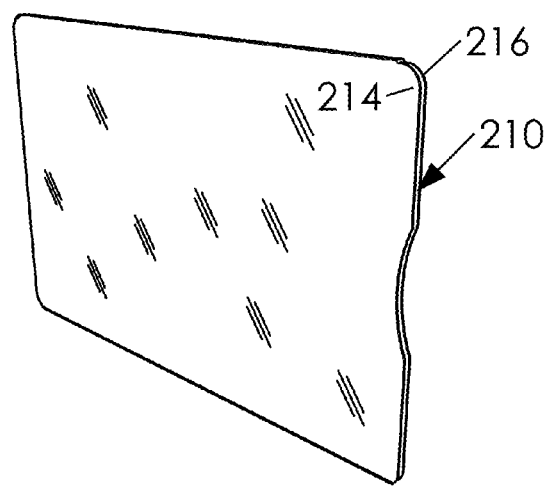

FIGS. 2A and 2B illustrate an elevated front view and a perspective overview of a sleeve 200. Sleeve 200 can comprise a plurality of edges. Said plurality of edges can comprise a top edge 202, a bottom edge 204, a first side edge 206 and a second side edge 208. In one embodiment, one of said plurality of edges can comprise an open edge 210. In one embodiment, sleeve 200 can comprise an envelope capable of holding an object (such as said card 100) by opening said open edge 210 and inserting said card 100 through said open edge 210. In one embodiment, sleeve 200 can comprise a notch 212 (though not always). In one embodiment, sleeve 200 can comprise a first portion 214 and a second portion 216. In one embodiment, said sleeve 200 can comprise first portion 214 and second portion 216 bound at three of said plurality of edges and open at said open edge 210. Sleeve 200 can comprise a width 218 and a height 220. In one embodiment, said width 218 is substantially similar to said card width 111 and said height 220 is substantially similar to said card height 110.

In one embodiment, said sleeve 200 can be kept on said card 100 while storing said card 100 in a wallet without removing said sleeve 200.

Figure 2C:
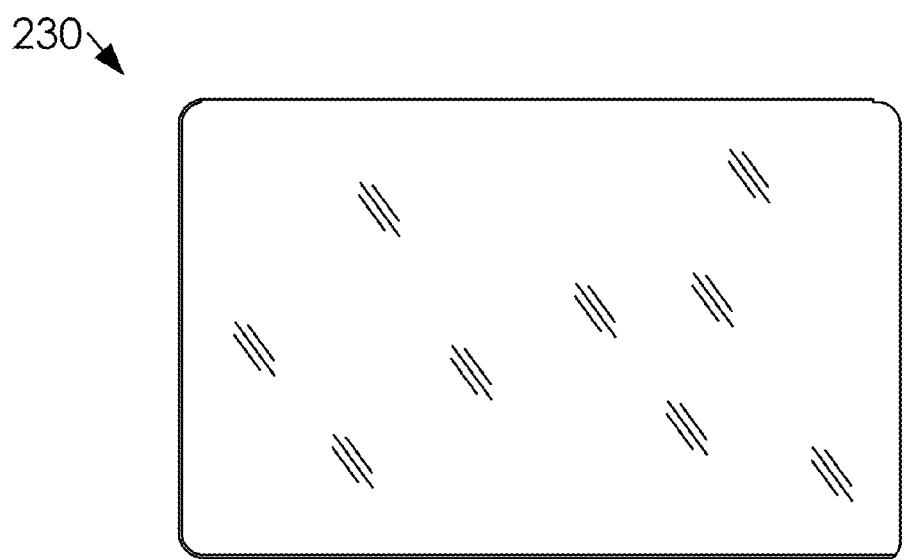
FIG. 2C illustrates an elevated front view of an unnotched sleeve 230.
Figure 3A:
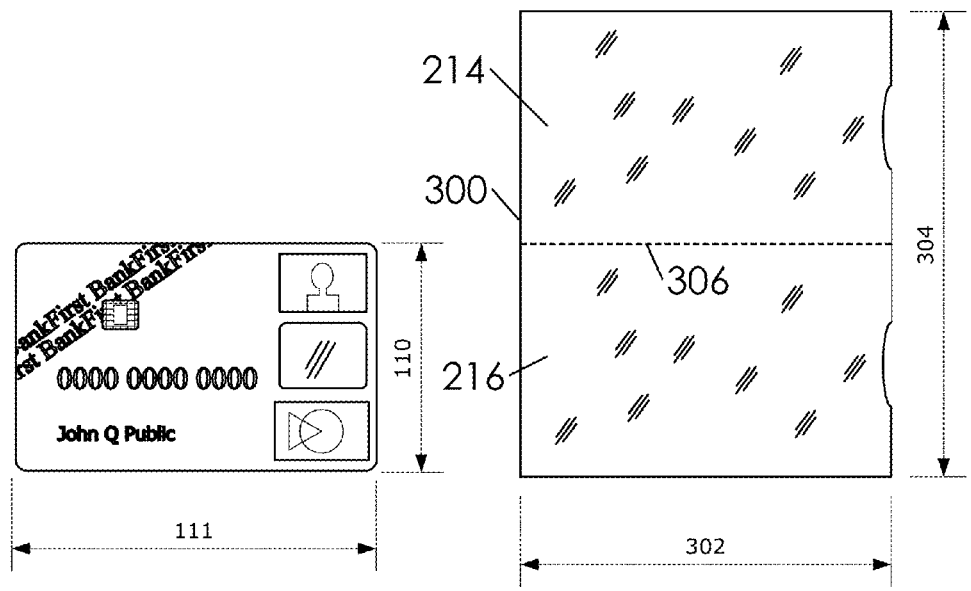
FIGS. 3A, 3B, 3C and 3D illustrate a plurality of views of a first construction method for said sleeve 200.
Figure 3B:
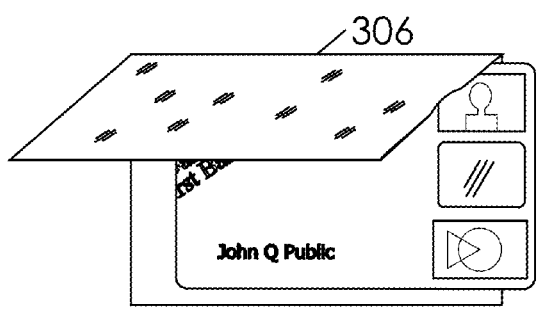
Figure 3C:
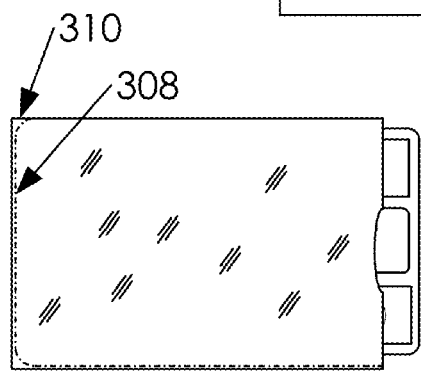
Figure 3D:
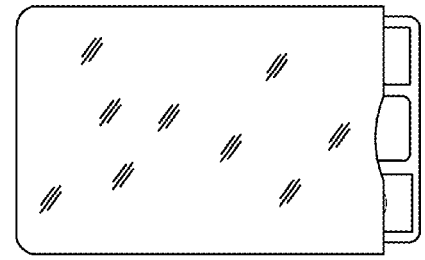

FIG. 2C illustrates an elevated front view of an unnotched sleeve 230. In one embodiment, said unnotched sleeve 230 can be substantially similar to said sleeve 200 however, said unnotched sleeve 230 can lack said notch 212.e FIGS. 3A, 3B, 3C and 3D illustrate a plurality of views of a first construction method for said sleeve 200. FIG. 3A illustrates an elevated front view of card 100 with a cut sleeve material 300. FIG. 3B illustrates an elevated front view of said cut sleeve material 300 bending around said card 100. FIG. 3C illustrates an elevated front view of cut sleeve material 300 welded around said card 100. FIG. 3D illustrates an elevated front view of cut sleeve material 300 trimmed into said sleeve 200. In one embodiment, said cut sleeve material 300 can comprise a width 302 and a height 304.

In one embodiment, creating said sleeve 200 from said cut sleeve material 300 can comprise: cutting said cut sleeve material 300 from a sheet of a sleeve material, folding said cut sleeve material 300 at a folded edge 306 between said first portion 214 and second portion 216; and welding said first portion 214 and said second portion 216 together at a welded edge 308. In one embodiment, creating said sleeve 200 from said cut sleeve material 300 can further comprise removing an excess material 310 from said cut sleeve material 300. In one embodiment, cut sleeve material 300 can comprise said sleeve material. In one embodiment, said cutting said cut sleeve material 300 from a sheet of said sleeve material can comprise die cutting said cut sleeve material 300 therefrom.

In one embodiment, cut sleeve material 300 can comprise a substantially non-opaque, flexible material. In one embodiment, cut sleeve material 300 can comprise a category 5 recyclable material (unlike the prior art such as Tyvek). In one embodiment, cut sleeve material 300 can comprise a biodegradable polyethelene film. In one embodiment, cut sleeve material 300 can comprise a film comprising a high clarity. In one embodiment, magnetic strip 107 can be read through cut sleeve material 300.

Figure 4A:
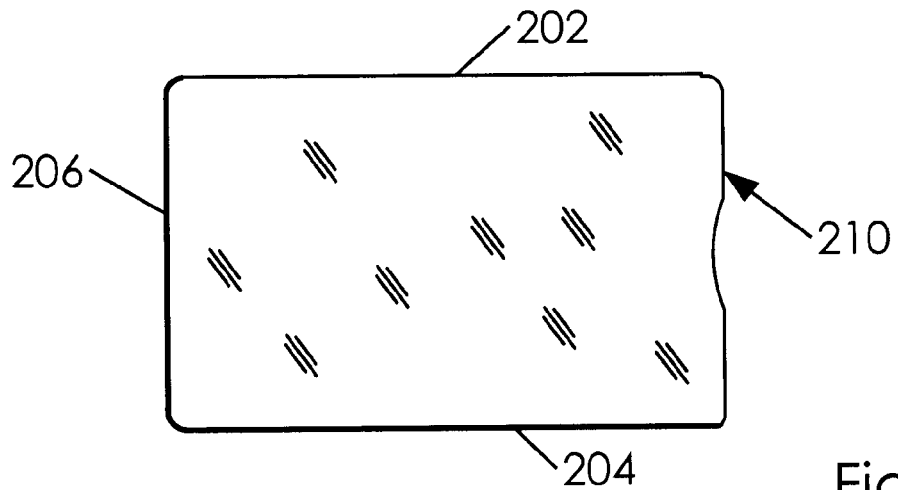
FIGS. 4A, 4B and 4C illustrate an elevated front view, a lower perspective overview and an upper perspective overview of sleeve 200
Figure 4B:
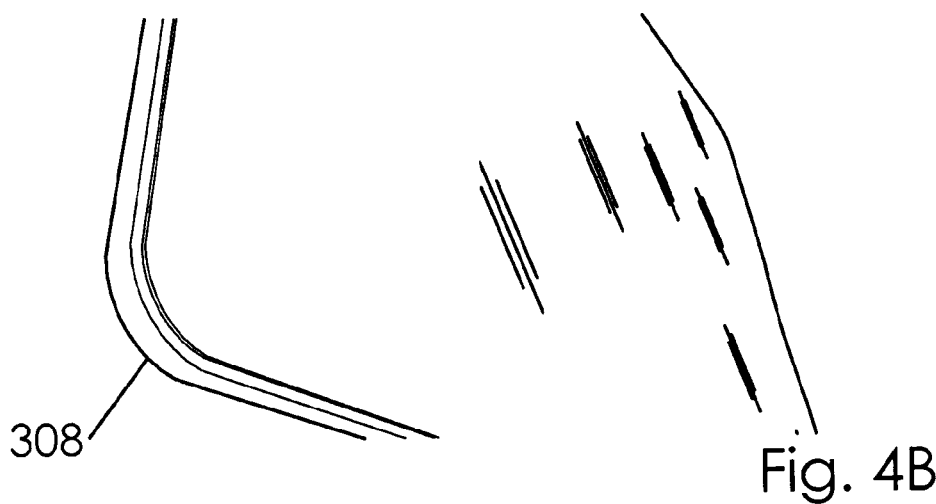
Figure 4C:
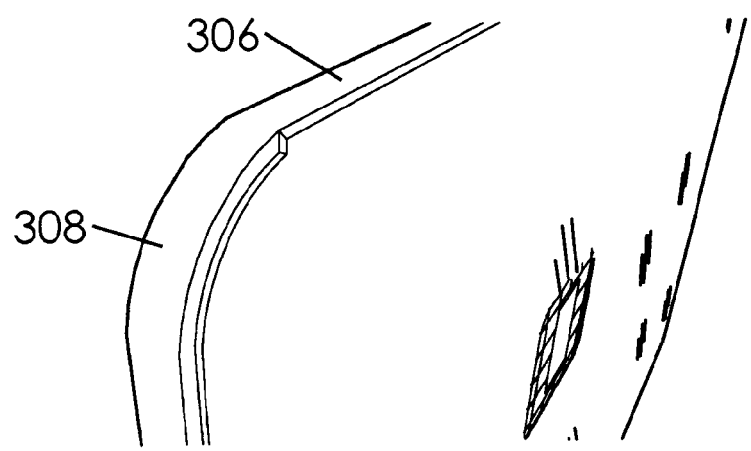

FIGS. 4A, 4B and 4C illustrate an elevated front view, a lower perspective overview and an upper perspective overview of sleeve 200. In one embodiment, said welded edge 308 can comprise a seam with a minimum visual appearance but still capable of holding said first portion 214 and second portion 216 together while being used in card readers.

In one embodiment, welding said welded edge 308 can comprise: welding said first portion 214 to said second portion 216 with a welding process. In one embodiment, said welding process can comprise a sonic weld. In one embodiment, welding process can comprise an impulse weld.

In one embodiment, said welding process can comprise a high frequency weld. In one embodiment, said high frequency weld can hold certain plastics with chemical dipoles, such as PVC, polyamides (PA) and/or acetates can be heated with high frequency electromagnetic waves. High frequency welding can use this property to soften the plastics for joining. The heating can be localized, and the process can be continuous. Also known as Dielectric Sealing, R.F. (Radio Frequency) Heat Sealing.

In one embodiment, said welding process can comprise an induction weld. In a ferromagnetic work piece, plastics can be induction-welded by formulating them with metallic or ferromagnetic compounds, called susceptors. These susceptors absorb electromagnetic energy from an induction coil, become hot, and lose their heat energy to the surrounding material by thermal conduction.

In one embodiment, said welding process can comprise radio frequency welding (also known as "RF welding"). Radio frequency welding is a very mature technology that has been around since the 1940s. Two pieces of material are placed on a table press that applies pressure to both surface areas. Dies are used to direct the welding process. When the press comes together, high frequency waves (usually 27.12 MHz) are passed through the small area between the die and the table where the weld takes place. This high frequency (radio frequency) field causes the molecules in certain materials to move and get hot, and the combination of this heat under pressure causes the weld to take the shape of the die. RF welding is fast. This type of welding is used to connect polymer films used in a variety of industries where a strong consistent leak-proof seal is required. In the fabrics industry, RF is most often used to weld PVC and polyurethane (PU) coated fabrics. This is a very consistent method of welding. The most common materials used in RF welding are PVC and polyurethane. It is also possible to weld other polymers such as nylon, PET, EVA and some ABS plastics.

Figure 5A:
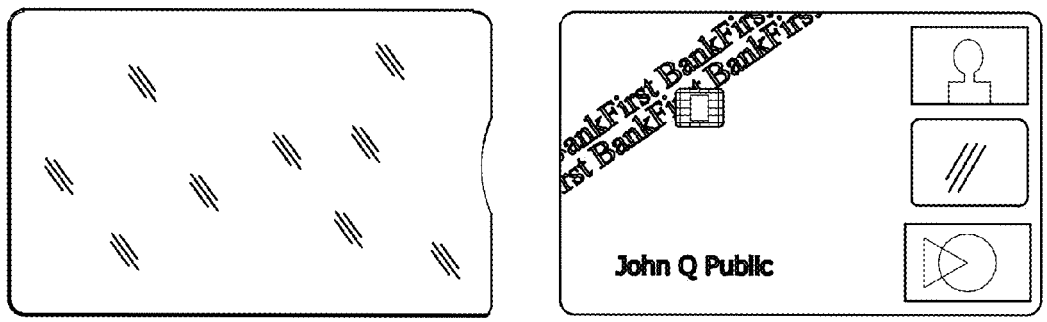
FIGS. 5A, 5B and 5C illustrate an elevated front view of card 100 outside of sleeve 200, card 100 inserted into sleeve 200 and card 100 inside of sleeve 200.
Figure 5B:
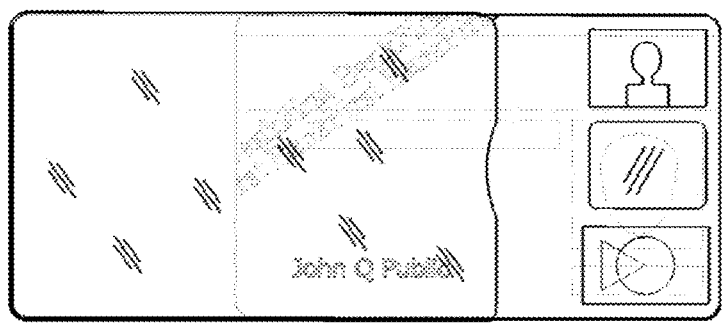
Figure 5C:
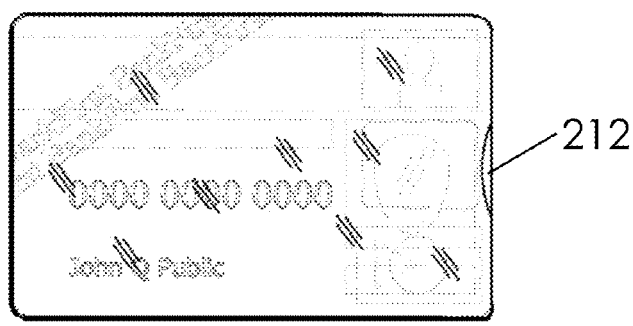

FIGS. 5A, 5B and 5C illustrate an elevated front view of card 100 outside of sleeve 200, card 100 inserted into sleeve 200 and card 100 inside of sleeve 200. In one embodiment, notch 212 can open said sleeve 200 around a portion of card 100; wherein card 100 can be accessed for removing said card 100 from said sleeve 200.

In one embodiment, sleeve 200 can comprise a flap capable of folding over said open edge 210 of sleeve 200 and tuck inside of open edge 210. In one embodiment, said flap can tuck completely within said plurality of edges and thereby can leave no edges possible for snagging or hanging up on various card readers.

In one embodiment, sleeve 200 can protect both sides of card 100, including any custom embodiments of said card 100 (that have been thermally imprinted on a blank stock card, for example). In one embodiment, sleeve 200 can extend a usefulness time period of card 100 by protecting said card 100 from friction and environmental damage.

In one embodiment, sleeve 200 can protect card 100 by not using an adhesive to hold said sleeve 200 to said card 100. Further, but not adding an adhesive (in one embodiment) said card 100 can be removed from sleeve 200 without damaging either said card 100 or said sleeve 200.

Figure 6:
FIG. 6 illustrates a perspective rear overview of sleeve 200 holding said card 100.

FIG. 6 illustrates a perspective rear overview of sleeve 200 holding said card 100.

Figure 7A:
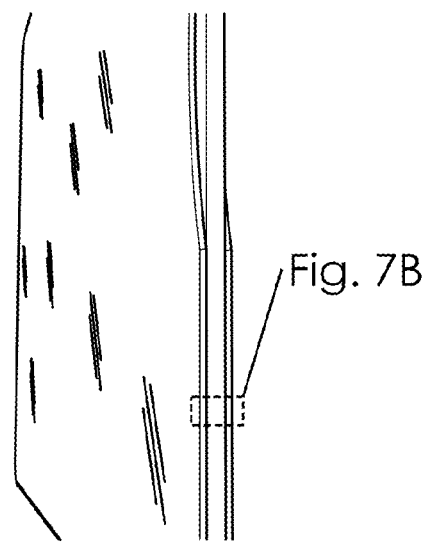
FIGS. 7A and 7B illustrate a perspective side view and an elevated side view of second side edge 208.
Figure 7B:
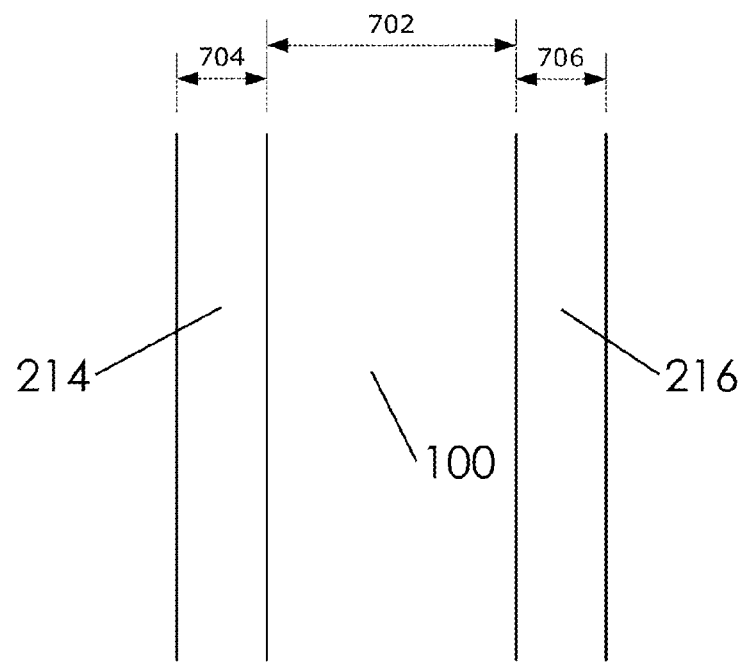

FIGS. 7A and 7B illustrate a perspective side view and an elevated side view of second side edge 208. In one embodiment, card 100 can comprise a thickness 702. In one embodiment, first portion 214 of sleeve 200 can comprise a thickness 704. In one embodiment, second portion 216 of sleeve 200 can comprise a thickness 706. In one embodiment, said thickness 704 and said thickness 706 can be approximately 0.001" (otherwise known as 1 mil). In one embodiment, cut sleeve material 300 can comprise a polyester or polyethelene material. In one embodiment, thickness 704 and thickness 706 can vary up to 0.003" if necessary.

In one embodiment, sleeve 200 can comprise an affable solution to the prior art (such as Tyvek sleeves) in that sleeve 200 can be made to be tight on the surface of card 100 and thereby render card 100 as useable as if sleeve 200 were not on card 100 at all.

Figure 8:
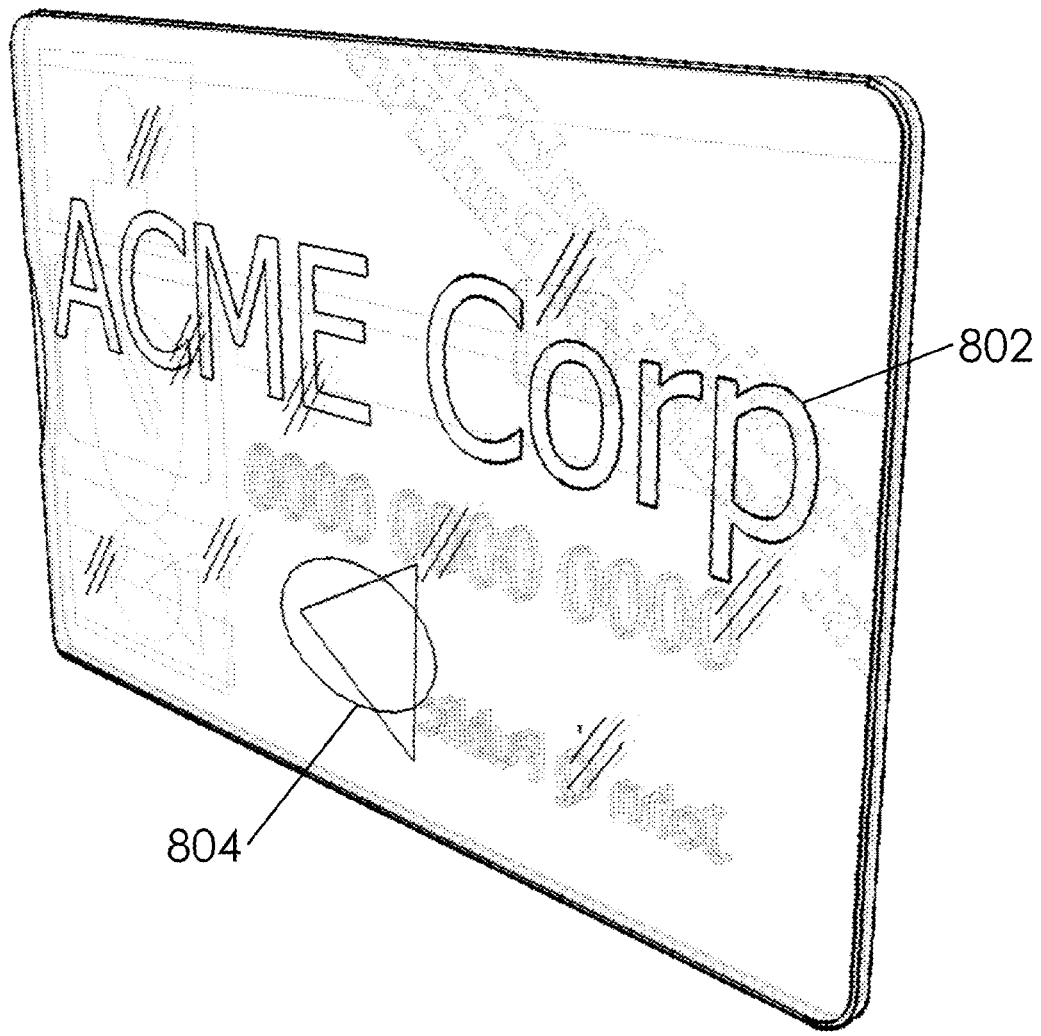
FIG. 8 illustrates a perspective rear overview of sleeve 200 holding said card 100.
Figure 10A:
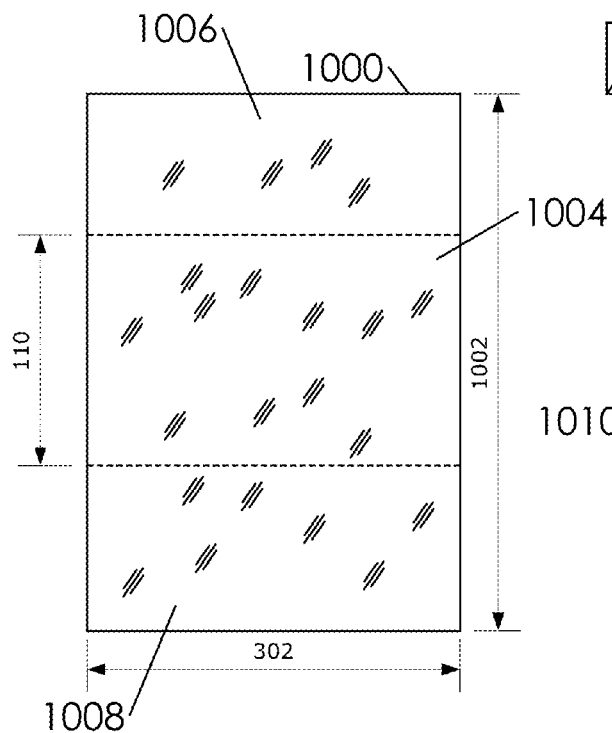
FIGS. 10A, 10B, 10C and 10D illustrate an elevated front view of a cut sleeve material 1000, a perspective front view of said cut sleeve material 1000 being folded, an elevated front view of a sleeve 1001 with said card 100, and an elevated rear view of said sleeve 1001 with said card 100.
Figure 10B:
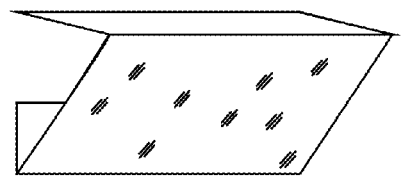
Figure 10C:
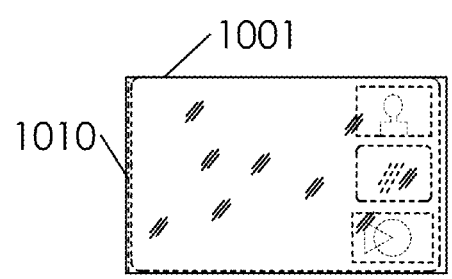
Figure 10D:
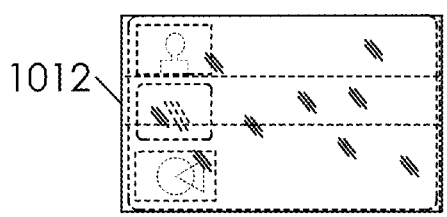

FIG. 8 illustrates a perspective rear overview of sleeve 200 holding said card 100. In one embodiment, sleeve 200 can comprise a graphic. In one embodiment, said graphic can comprise one or more letters 802 and/or one or more logos 804. In one embodiment, said cut sleeve material 300 can comprise a graphically printable material. Thus, in one embodiment, sleeve 200 can comprise several options for adding custom designs (such as one or more letters 802 and one or more logos 804) to a surface of said sleeve 200. In one embodiment, one or more portions of sleeve 200 can be left uncovered by said one or more letters 802 and/or one or more logos 804 in order to facilitate accessing one or more information sources on said card 100. In one embodiment, said information sources can comprise magnetic strip 107, a CVV code, and one or more numbers on card 100.

FIGS. 9A, 9B, 9C and 9D illustrate a plurality of views of a second construction method for said sleeve 200. FIG. 9A illustrates an elevated front view of card 100 with a cut sleeve material 900. FIG. 9B illustrates an elevated front view of said cut sleeve material 900 bending around said card 100. FIG. 9C illustrates an elevated front view of cut sleeve material 900 welded around said card 100. FIG. 9D illustrates an elevated front view of cut sleeve material 900 trimmed into said sleeve 200.

In one embodiment, said cut sleeve material 900 can be similar to said cut sleeve material 300 with the additional feature of an adhesive flap 902. In one embodiment, said cut sleeve material 900 can comprise said width 302 and a height 904. In one embodiment, said adhesive flap 902 can comprise a height 905. In one embodiment, said height 904 can comprise a length equal to or greater than the sum of said card height 110 times two and said height 905. In one embodiment, said adhesive flap 902 can comprise an adhesive strip 907.

In one embodiment, said cut sleeve material 900 can be formed into a sleeve 908 by: cutting said cut sleeve material 900 to said width 302 and said height 904; folding at said folded edge 306 between a first portion 910 and a second portion 912; creasing between said second portion 912 and said adhesive flap 902 at a second folded edge 914; attaching said first portion 910 to said second portion 912 at a first side weld 916 and a second side weld 918. In one embodiment, said sleeve 908 can comprise three sealed edges and one open edges; wherein said open edge can comprise an opening near said adhesive flap 902. In one embodiment, said card 100 can slide into said open edge. In one embodiment, said adhesive flap 902 can fold over and seal around said card 100 so as to close said open edge and hold in said card 100.

FIGS. 10A, 10B, 10C and 10D illustrate an elevated front view of a cut sleeve material 1000, a perspective front view of said cut sleeve material 1000 being folded, an elevated front view of a sleeve 1001 with said card 100, and an elevated rear view of said sleeve 1001 with said card 100. In one embodiment, said cut sleeve material 1000 can comprise a height 1002. In one embodiment, said cut sleeve material 1000 can comprise a first panel 1004, a second panel 1006 and a third panel 1008. In one embodiment, forming said sleeve 1001 can comprise folding said cut sleeve material 1000 into said first panel 1004, said second panel 1006, and said third panel 1008; attaching a portion of said second panel 1006 to said third panel 1008; and welding said sleeve 1001 along a first side 1010. In one embodiment, said sleeve 1001 can comprise said first side 1010 and a second side 1012. In one embodiment, said second side 1012 can comprise an open side of said sleeve 1001 capable of receiving said card 100.

In one embodiment, any of said sleeve 200, sleeve 908 and/or said sleeve 1001 (or other sleeves described herein) can comprise a polypropylene or polyethylene. In one embodiment, any of said sleeves can be wire welded. In other words, the material can be folded over itself and the entire piece put under to "hot" wires. In one embodiment, the parts that overlap seal together and the remaining flap is just cut by way of heat due to the wire. In one embodiment, it works much like shrink wrap machines. In one embodiment, portions of this process can also be known as "impulse seal". In one embodiment, a wire element heated with electricity that can cut and seal in a straight line.

Figure 11A:
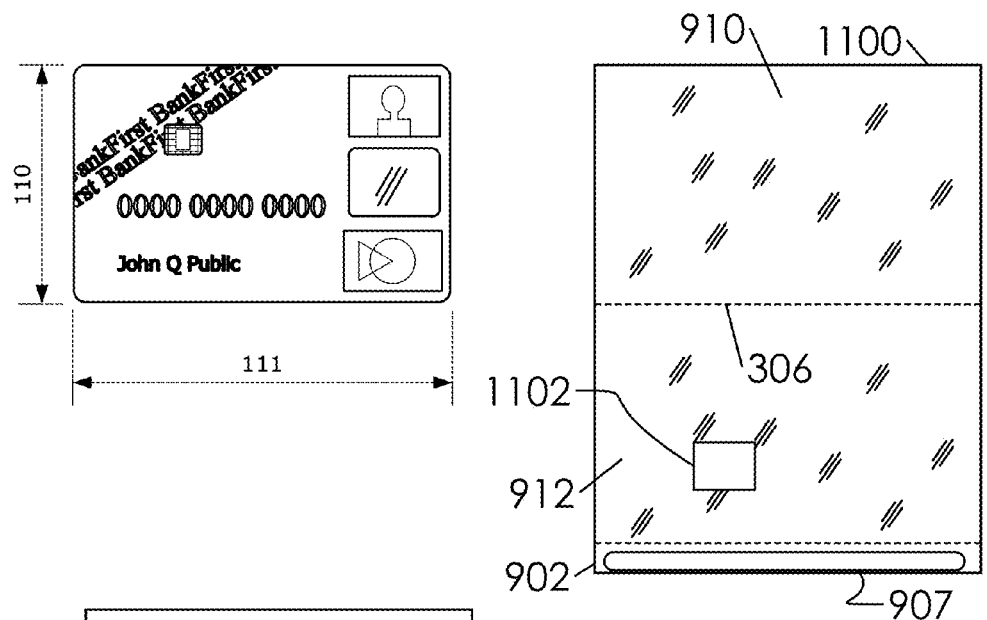
FIGS. 11A, 11B, 11C, 11D and 11E illustrate a plurality of views of a fourth construction method for said sleeve 200.
Figure 11B:
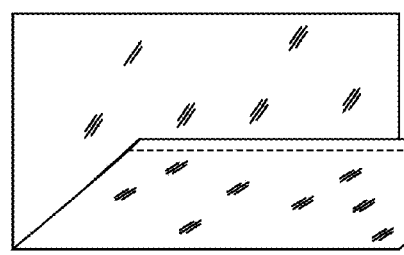
Figure 11D:
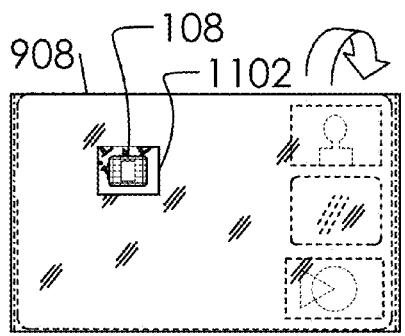
Figure 11C:
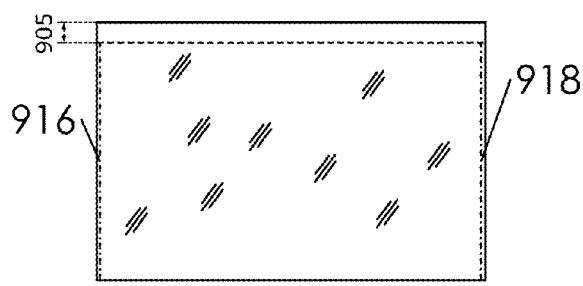
Figure 11E:
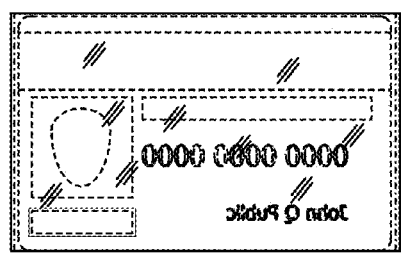

FIGS. 11A, 11B, 11C, 11D and 11E illustrate a plurality of views of a fourth construction method for said sleeve 200. FIG. 11A illustrates an elevated front view of card 100 with a cut sleeve material 1100. FIG. 11B illustrates an elevated front view of said cut sleeve material 1100 bending around said card 100. FIG. 11C illustrates an elevated front view of cut sleeve material 1100 welded around said card 100. FIG. 11D illustrates an elevated front view of cut sleeve material 1100 trimmed into said sleeve 200. FIG. 11E illustrates an elevated rear side view of cut sleeve material 1100 trimmed into said sleeve 200.

In one embodiment, said cut sleeve material 1100 can be similar to said cut sleeve material 900 with the additional feature of a tag window 1102. In one embodiment, said tag window can comprise a die cut portion of said sleeve material 1100 exposing a portion of said electronic tag 108. In one embodiment, said tag window 1102 can be positioned such that said electronic tag 108 is exposed from beneath said sleeve 200 with said sleeve 200 on said machine readable card 100. In one embodiment, said tag window 1102 can be created with a die cut window.

Figure 12:
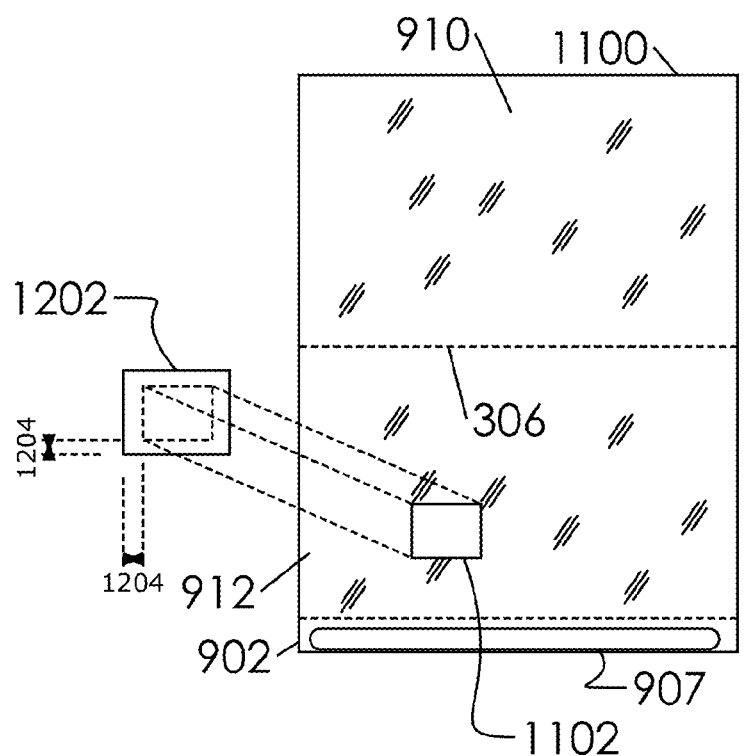
FIG. 12 illustrates said sleeve 200 with said tag window 1102 and a conductive film 1202.

FIG. 12 illustrates said sleeve 200 with said tag window 1102 and a conductive film 1202. In one embodiment, said tag window 1102 can be covered with said conductive film 1202. In one embodiment, said conductive film 1202 can comprise an electrically conductive film which can be volume conductive. In one embodiment, said conductive film 1202 can be manufactured by the addition of beads of glass backed into said conductive film 1202 which a conductivity to said conductive film 1202. In one embodiment, said conductive film 1202 can allow about 5 volts to pass through itself and therefore allow said electronic tag 108 to communicate from within said sleeve 200 without removing said sleeve 200 from said machine readable card 100. In one embodiment, said conductive film 1202 can comprise an electrically conductive polymer film, which are available in the marketplace without further experimentation. In one embodiment, said conductive film 1202 can be larger by length and width than said tag window 1102 to allow an overlap 1204 to attach said conductive film 1202 to said sleeve 200. In one embodiment, said conductive film 1202 can be attached to said sleeve 200 through well-known welding, heat treatment, and/or adhesive techniques. In one embodiment, said conductive film 1202 and said tag window 1102 can be eliminated by constructing said sleeve 200 with materials herein disclosed as being eligible for constructing said conductive film 1202 (such as said electrically conductive polymer film). Accordingly, all of said sleeve 200 can be conductive and therefore there is no need to cut said tag window 1102, and align and attach said conductive film 1202. Market conditions (such as raw material costs) may have a bearing on which embodiment is preferred at the time of manufacture. In one embodiment, said electronic tag 108 can comprise a tag signal capable of passing through said electrically conductive material, as discussed above.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A machine readable card protector comprising:
    a sleeve having a first portion, a second portion, a width and a height;
    said sleeve having a plurality of edges having a first side edge, a second side edge, a top edge, and a bottom edge;
    a machine readable card having a first side, a second side, a card width and a card height;
    said sleeve having at least one open edge being wide enough allow said machine readable card to slide into said sleeve;
    said sleeve having at least one of said plurality of edges are sealed with a heat weld between said first portion and said second portion;
    said machine readable card having one or more machine readable components;
    with said machine readable card held inside of said sleeve, a portion of said one or more machine readable components are covered from wear and tear;
    said sleeve consists of a sleeve material;
    a portion of said machine readable components can be electronically read through said sleeve;
    said one or more machine readable components comprise an electronic tag;
    a portion of said sleeve comprises a electrically conductive material positioned above said electronic tag of said machine readable card;
    said electronic tag selectively generates a tag signal; and
    said tag signal selectively passes through said electrically conductive material.

2. The machine readable card protector of claim 1 wherein,
    said sleeve comprises a tag window positioned above said electronic tag of said machine readable card;
    said tag window is covered by a conductive film;
    said conductive film is larger than said tag window, having an overlap with said sleeve;
    said conductive film is affixed over said tag window; and
    said conductive film comprises an electrically conductive material.

3. The machine readable card protector of claim 1 wherein said one or more machine readable components comprise a signature block, an identifier, a bank logo, a hologram, a user picture, a thumbprint, a magnetic strip or an electronic tag.

4. The machine readable card protector of claim 1 wherein said sleeve material comprises a non-opaque and flexible material.

5. The machine readable card protector of claim 1 wherein said sleeve material consists of a polyethelene film and no other materials.

6. The machine readable card protector of claim 1 wherein said sleeve material comprises a polyester.

7. The machine readable card protector of claim 1 wherein
    said sleeve material comprises an electrically conductive material;
    said electronic tag generates a tag signal; and
    said tag signal can pass through said electrically conductive material.

8. The machine readable card protector of claim 1 further comprising a notch in said sleeve; wherein, a portion of said machine readable card remains uncovered by said sleeve at said notch when said machine readable card is inserted into said sleeve.

9. The machine readable card protector of claim 1 wherein said machine readable card in said sleeve can be read in a card reader without removing said sleeve.

10. The machine readable card protector of claim 1 wherein said machine readable card is held within said sleeve without an adhesive.

11. The machine readable card protector of claim 1 wherein said sleeve material comprises a graphic.

12. The machine readable card protector of claim 1 further comprising an adhesive flap; wherein,
said adhesive flap is capable of holding a portion of said first portion to said second portion.

13. A method of protecting a machine readable card comprising:
creating a sleeve from a sleeve material,
inserting a machine readable card into said sleeve,
using said machine readable card within said sleeve,
protecting one or more machine readable components on said machine readable card; and wherein,
said one or more machine readable components comprise an electronic tag;
a portion of said sleeve comprises a electrically conductive material positioned above said electronic tag of said machine readable card;
said electronic tag selectively generates a tag signal; and
said tag signal selectively passes through said electrically conductive material.

14. The method of protecting a machine readable card of claim 13 wherein creating said sleeve from said sleeve material comprises:
folding said sleeve material at a folded edge between a first portion and a second portion of said sleeve;
welding at least one of a plurality of edges of said sleeve together; and
leaving at least one of said plurality of edges of said sleeve unwelded at an open edge capable of receiving a portion of said machine readable card.

15. The method of protecting a machine readable card of claim 14 wherein welding at least one of said plurality of edges of said sleeve together comprises wire welding.

16. The method of protecting a machine readable card of claim 14 wherein welding at least one of said plurality of edges of said sleeve together comprises sonic welding.

17. The method of protecting a machine readable card of claim 14 wherein welding at least one of said plurality of edges of said sleeve together comprises high frequency welding.

18. The method of protecting a machine readable card of claim 14 wherein welding at least one of said plurality of edges of said sleeve together comprises radio frequency welding.

19. The method of protecting a machine readable card of claim 13 wherein creating said sleeve from said sleeve material comprises:
folding said sleeve material at a folded edge between a first portion and a second portion of said sleeve;
creasing between said second portion and an adhesive flap in said sleeve material;
attaching said first portion to said second portion with said adhesive flap; and
leaving at least one of a plurality of edges of said sleeve unwelded at an open edge capable of receiving a portion of said machine readable card.

20. The method of protecting a machine readable card of claim 13 wherein creating said sleeve from said sleeve material comprises:
folding said sleeve material at a folded edge between a first panel, a second panel and a third panel of said sleeve;
attaching a portion of said second panel to said third panel leaving at least one of a plurality of edges of said sleeve unwelded at an open edge capable of receiving a portion of said machine readable card.

21. The method of protecting a machine readable card of claim 13 further comprising:
covering a tag window with a conductive film; wherein,
said sleeve comprises said tag window positioned above said electronic tag of said machine readable card;
said tag window is covered by a conductive film;
said conductive film is larger than said tag window, having an overlap with said sleeve;
said conductive film is affixed over said tag window; and
said conductive film comprises an electrically conductive material.

* * * * *